United States Patent Office 3,558,737
Patented Jan. 26, 1971

3,558,737
OLEFIN POLYMERIZATION
George S. Saines, Fishkill, N.Y., assignor to Texas Development Corporation, New York, N.Y., a corporation of Delaware
No Drawing. Filed July 26, 1968, Ser. No. 747,807
Int. Cl. C07c 3/20
U.S. Cl. 260—683.15
10 Claims

ABSTRACT OF THE DISCLOSURE

A process for the polymerization and co-polymerization of propylene and butenes by contacting the olefin with a catalyst composed of gamma-alumina and chlorine or bromine having a surface area of 75 to 150 square meters per gram and about 3.0 to 15.0 weight percent chlorine and bromine. Polymerization is conducted at temperatures ranging from about −20° C. to about 50° C. such that liquid polymers and co-polymers having an average molecular weight of at least 800 are provided which are useful as additives for lube oils, caulking compounds and gasoline additives.

---

This invention relates to the polymerization of $C_3$ and $C_4$ olefins. In particular, this invention relates to the polymerization of propylene and butenes to form low molecular weight liquid polyolefins.

The polymerization of low molecular weight olefins such as propylene, butene-1 and butene-2 to form dimers, trimers and/or tetramers by employing as catalyst a chlorinated alumina catalyst having a surface area of more than 250 square meters per gram and preferably more than 300 square meters per gram is taught in U.S. Patent 3,268,618. Such prior art catalysts were taught to be righ surface area materials where the activity was a function of the amount of chlorine taken up by the catalyst which in turn depended upon a high alumina surface area. While the process described therein produced liquid polyolefin materials, the material produced required fractionation to recover selected components inasmuch as the product consisted of substantial amounts of unconverted monomer and dimers along with polymers having widely divergent molecular weights. Consequently, such a process left much to be desired particularly where a more uniform product consisting of narrower range molecular weight liquid polyolefins were sought. Additionally, where high yields of desired liquid polyolefins having molecular weights of at least 800 were desired such a process left substantial room for improvement.

In copending applications Ser. No. 646,455, filed June 16, 1967 and Ser. No. 684,489, filed Nov. 20, 1967 and assigned to the assignee hereof, highly active hydrocarbon conversion catalysts useful for alkylation and polymerization are set forth. While the catalysts provided therein in general are useful as polymerization catalysts, further investigation has shown that selected chlorinated alumina catalysts when employed under particular polymerization conditions provide higher yields of polymerized $C_3$ and $C_4$ monomers of average molecular weights of at least 800 than heretofore available.

It is therefore an object of this invention to provide a process for the polymerization of low molecular weight olefins to liquid polymers.

Another object of this invention is to provide a process for the polymerization of $C_3$ and $C_4$ olefins to liquid polymers in high yields.

Yet another object of this invention is to provide a process for the polymerization of $C_3$ and $C_4$ olefins to polymers having average molecular weights of at least 800 and up to 1200 or higher and preferably from 900 to 1200 which are useful as fuel additives, lube oil additives and components for gasoline and caulking compounds.

Other objects and advantages will become apparent from a reading of the following detailed description and examples. By the term polymerization we means to include co-polymerization of $C_3$ and $C_4$ olefins.

Broadly, this invention contemplates a process for preparing liquid polymers having average molecular weights of at least 800 which comprises contacting an olefinic hydrocarbon having from 3 to 4 carbon atoms at a temperature of from about −20 to 50° C. with a catalyst consisting essentially of gamma-alumina and chlorine or bromine where said catalyst has a surface area of from 75 to 150 square meters per gram and about 3.0 to about 15.0 weight percent chlorine or bromine.

In a highly preferred embodiment this invention provides liquid polymers as described above where the polymerization is undertaken in the presence of ethylene. By introducing substantial amounts of ethylene into the reaction zone a molecular weight increase of, for example, 10 percent is provided to the liquid polymer. Such molecular weight increase of the resulting polymer by virtue of the presence of ethylene during the polymerization reaction cannot be explained at this time inasmuch as no detectable amounts of ethylene are incorporated into the polymer. The beneficial effects of employing ethylene during the polymerization of $C_3$ and $C_4$ olefins are realized when from about 0.5 to 4.0 moles of ethylene are present per mole of olefin and preferably I employ from 2 to 3 moles of ethylene per mole of olefin.

As mentioned above, selected catalytic compositions when employed under particular polymerization conditions behave in a highly selective manner such that liquid polymers of $C_3$ and $C_4$ olefins polymerize within a narrow average molecular weight range as hereinabove provided in high yields. The catalyst contemplated herein comprises a catalytically active gamma-alumina having a surface area of from 75 to 150 square meters per gram and about 3.0 to about 15.0 weight percent chlorine or bromine. Such a catalyst may be prepared by for example, contacting gamma-alumina with the vapor of a compound of the formula:

where X and Y may be the same or different and are selected from H, Cl, Br, F or SCl or where X and Y together are O or S. Alternatively, such a catalyst may be prepared by employing an organic compound or a mixture of organic compounds as activating agents in conjunction with chlorine or bromine. The organic compound comprises at least 2 atoms of carbon, X atoms of hydrogen, Y atoms of chlorine and/or bromine and may or may not contain oxygen or sulfur. Either X or Y may be zero. The mole ratio of molecular chlorine and/or bromine to the organic compound must be greater than $$\frac{X-Y}{2}$$

if X is equal to or greater than Y or greater than 0 if X is less than Y. The amount of chlorine or bromine should be greater if the organic compound contains sulfur. Specifically, if there is X atoms of sulfur in the organic compound the mole ratio of chlorine or bromine (Y) to organic compound should be greater than $$\frac{X+2Z-Y}{2}$$

if $X+2Z$ is equal to greater than Y or greater than 0 if $X+2Z$ is less than Y.

Appropriate compounds contemplated as activating agents include carbon tetrachloride, chloroform, methylene chloride, phosgene, trichloroacetyl chloride, sym-tetrachloroethane, tetrachloroethylene, hexachloroethane, pentachloroethane, hexachloroacetone, hexachloro-1,3-butadiene, hexachloropropanone-2, hexachlorocyclopentadiene, trichloroacryloyl chloride, and chloral. Particularly preferred compounds are carbon tetrachloride and tetrachloroethylene for purposes of activating the gamma-alumina. Further, organic compounds not containing halides can be used in conjunction with sufficient chlorine or bromine, for example ethane and ethylene. The exact mechanism by which the gamma-alumina composite is activated is not precisely understood especially since the process can be performed in the absence of oxygen or in an oxygen containing atmosphere.

With respect to temperature we have found that temperatures of at least 200° F. and preferably 400° F. are suitable for the preparation of highly active polymerization catalysts of its type described above. Temperatures below 200° F. are generally insufficient to provide an active catalyst useful for commercial size operations. Further, temperatures in excess of 800° F. tend to promote the formation of aluminum halides such as aluminum chloride or other side products. In general, the applicable temperatures range from about 200 to 800° F. and most preferably from 450 to 650° F.

As mentioned above, the polymerization catalyst employed herein consists essentially of a chlorided or bromided gamma-alumina possessing a relatively low surface area of from 75 to 150 square meters per gram. Low surface area gamma-aluminas contemplated herein corresponds to commercially available materials and their methods of preparation are known to one skilled in the art. Further, the catalyst prepared by our invention can be produced pellet, granular, bead or pulverulent form to facilitate its use in fixed beds, moving beds or fluidized solid beds as is also well known in the art. The activated catalyst may be prepared in situ in the polymerization reactor by-passing a stream of chlorine or bromine through a vessel containing the organic compound such as tetrachloroethylene. This activator effluent is charged into polymerization reactor containing the low surface area gamma-alumina and the reactor is maintained at a temperature between 200 and 800° F. during activation. The effluent from the polymerization reactor consists largely of chlorine and/or bromine and saturated chlorocarbons and the excess saturated chlorocarbons may be recycled for reintroduction and recontacting of the gamma-alumina. Alternatively, the gamma-alumina may be charged to the reactor, carbon tetrachloride subsequently introduced and the reactor sealed and heated to the appropriate temperature under pressure wherein the gamma-alumina is chlorided.

The catalyst prepared in accordance with this invention is highly active at relatively low temperatures. Olefin streams consisting of propylene, butene-1, butene-2, or mixtures thereof are polymerized or co-polmerized employing our catalyst at temperatures ranging from about —20 to 50° C. and preferably from about 0 to 20° C. Polymerization can be effected in either the liquid or vapor phase. Pressures from atmospheric to 120 p.s.i.a. have been found to be appropriate in static or batch processes. Where continuous operations are preferred I have found that the volume of gaseous olefin charged per hour per volume of catalyst within the range of about 2.5 to 5.0 milliliters per minute of monomer per gram of catalyst is suitable for polymerization utilizing the catalyst of this invention. Moreover, the reaction may be carried out in the presence of a diluent such as a $C_5$ to $C_{10}$ paraffin hydrocarbon and exemplified by pentane, hexane, heptane, octane and decane and iso-mers thereof. In view of the low polymerization temperatures employed, alkylation of the diluent presents no difficulties. Preferably we employ straight chain hydrocarbons. Further, whether batch or continuous polymerization is contemplated operating temperatures below —20° C. should be avoided inasmuch as catalyst activity is severely curtailed whereas polymerization temperatures exceeding 50° C. severely decreased the molecular weight of the polymer to below the specified level.

When employing our catalyst the contemplated polymerization process proceeds by charging for example chlorinated gamma-alumina catalyst into a reactor under a nitrogen atmosphere and adding dry n-heptane as diluent. The mixture is agitated and the reactor cooled to about 0° C. by external means and upon reaching this temperature monomer is fed into the reactor at the rate of 5 milliliters per minute of monomer per gram of catalyst for a period of about 4 hours whereupon the monomer flow is stopped, the liquid contents of the reactor washed consecutively with a 1:1 isopropyl alcohol-water solution, a saturated sodium bicarbonate solution and water until the water washes are neutral. After drying the product a final stripping is conducted under vacuum for extended periods and the polymer subsequently recovered.

In a preferred embodiment, ethylene is introduced to the reactor concurrently with the monomer feed in a volume eual to 0.5 to 4.0 moles of ethylene per mole of $C_3$ or $C_4$ olefin. In this manner, the polymer product recovered possesses an average molecular weight increase of 10 percent in over that usually obtained in the absence of ethylene.

The liquid polymers provided above having average molecular weight of from 800 to 1200 and preferably from 900 to 1200 and derived from $C_3$ and $C_4$ olefins find utility as components for lube oils, caulking compounds and gasolines. Such polymers and copolymers provided herein and particularly those having molecular weights of 800 to 1200 are singularly effective for removing or preventing the formation of deposits on the intake valves and ports of a 4-cycle spark ignited internal combustion engine. More specifically, a motor fuel composition comprising a mixture of hydrocarbons boiling in the gasoline boiling range containing from 0.01 to 0.20 volume percent of the polymer having an average molecular rate in the range of from about 800 to 1200 is effective for removing the aforesaid deposits. Highly effective fuel compositions obtained with the above polymers is more fully described and claimed in copending application Ser. No. 546,212, filed Apr. 29, 1966, now Patent No. 3,502,451 and assigned to the assignee hereof.

In order to more fully illustrate the nature of my invention and manner of practicing the same the following examples are presented.

EXAMPLE I 871 grams of commercially available 1/8 inch beads of gamma-alumina having a surface area of from 75 to 150 square meters per gram were dried at 1050° F. for 4 hours in an air stream and charged to a rotary polymerization reactor. Subsequently 118 grams of carbon tetrachloride was added and the reactor sealed and heated to 500° F. for 2 hours at a pressure of 260 p.s.i.g. A chlorided gamma-alumina catalyst, 916 grams, was recovered and possessed a chlorine content of 8.5 weight percent.

To 20 grams of the above catalyst contained in a polymerization reactor maintained at a temperature of 0° C. propylene was introduced at the rate of 108 milliliters per minute and 500 milliliters of n-heptane was employed as diluent. After 4 hours the polymerization reaction was stopped, the liquid contents washed with a 1:1 isopropyl alcohol-water solution, a saturated sodium bicarbonate solution and water. The product was finally dried under vacuum at 60° C. for 15 hours. A yield of 14.8 grams of polypropylene having an average molecular weight of 935 was recovered.

The above experiment was similarly conducted in the presence of chlorided eta-alumina catalyst, the catalyst possessing a surface area in excess of 150 square meters per gram. In this instance a yield of 7.6 grams of polymer having a molecular weight of 659 was recovered.

EXAMPLE II

In a manner similar to Example I, butene-1 was contacted with low surface area chlorided gamma-alumina catalyst and the olefin introduced at the rate of 98 milliliters per minute over a period of 5 hours. The liquid contents of the flask were washed, the solvent stripped as described in Example I and a yield of 20.5 grams of polybutene-1 having an average molecular weight of 930 was recovered.

EXAMPLE III

In the manner described in Example I, ethylene was added along with the propylene feed in an amount equaled to ½ of the volume of propylene introduced and the mixed stream contacted with the chlorided gamma-alumina catalyst. The product recovered, polypropylene, possessed an average molecular weight of 1037. No detectable amounts of ethylene were incorporated into the polymer.

I claim:

1. A process for preparing liquid polymers having average molecular weights of at least 800 which comprises contacting an olefinic hydrocarbon having from 3 to 4 carbon atoms at a temperature of from about −20 to 50° C. with a catalyst consisting essentially of gamma-alumina and chlorine or bromine where said catalyst has a surface area of from 75 to 150 square meters per gram and about 3.0 to about 15.0 weight percent chlorine or bromine.

2. A process according to claim 1 wherein said olefinic hydrocarbon is propylene.

3. A process according to claim 1 wherein said olefinic hydrocarbon is butene.

4. A process according to claim 1 wherein said temperature is from 0 to 20° C.

5. A process according to claim 1 wherein said contacting is undertaken in the presence of from about 0.5 to 4.0 moles of ethylene per mole of said olefinic hydrocarbon.

6. A process according to claim 1 wherein said contacting is undertaken in the presence of from about 2 to 3 moles of ethylene per mole of said olefinic hydrocarbon.

7. A process according to claim 1 wherein said contacting is undertaken at the rate of from about 2.5 to 5.0 milliliters per minute of said olefinic hydrocarbon per gram of said catalyst.

8. A process according to claim 1 wherein said contacting is undertaken in the presence of a diluent.

9. A process according to claim 8 wherein said diluent is a $C_5$ to $C_{10}$ paraffin hydrocarbon.

10. A process according to claim 1 wherein said liquid polymers have an average molecular weight of from 900 to 1200.

References Cited

UNITED STATES PATENTS

| | | | |
|---|---|---|---|
| 3,264,367 | 8/1966 | Pitkethly et al. | 260—683.15 |
| 3,268,618 | 8/1966 | Fletcher et al. | 260—683.15 |

PAUL M. COUGHLAN, Jr., Primary Examiner

U.S. Cl. X.R.

44—80

PO-1050
(5/69)

UNITED STATES PATENT OFFICE
CERTIFICATE OF CORRECTION

Patent No. 3,558,737              Dated   January 26, 1971

Inventor(s)   GEORGE S. SAINES

It is certified that error appears in the above-identified patent and that said Letters Patent are hereby corrected as shown below:

Column 1, lines 3 and 4, "Texas Development Corporation"

should read -- Texaco Inc.--

Column 1, line 37, "righ" should read --high--

Column 2, line 7, "means" should read --mean--

Signed and sealed this 9th day of May 1972.

(SEAL)
Attest:

EDWARD M.FLETCHER,JR.                ROBERT GOTTSCHALK
Attesting Officer                    Commissioner of Patents